(12) United States Patent
Wasily (10) Patent No.: US 8,340,195 B2
(45) Date of Patent: Dec. 25, 2012

(54) BUFFER SIZE REDUCTION FOR WIRELESS ANALOG TV RECEIVERS

(75) Inventor: Nabil Yousef Wasily, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 386 days.

(21) Appl. No.: 12/757,378

(22) Filed: Apr. 9, 2010

(65) Prior Publication Data

US 2011/0249720 A1 Oct. 13, 2011

(51) Int. Cl.
*H04N 7/12* (2006.01)
*H04N 11/02* (2006.01)

(52) U.S. Cl. .............................. 375/240.25; 375/240.26
(58) Field of Classification Search ............. 375/240.25, 375/240.26
See application file for complete search history.

(56) References Cited

U.S. PATENT DOCUMENTS 5,541,653 A * 7/1996 Peters et al. .................. 348/264
2011/0025680 A1 * 2/2011 Kim et al. ..................... 345/214

OTHER PUBLICATIONS

Wallace, G., The JPEG Still Picture Compression Standard. IEEE Transaction on Consumer Electronics, 1991.*

* cited by examiner

*Primary Examiner* — Richard Torrente
(74) *Attorney, Agent, or Firm* — Rahman LLC (57) ABSTRACT

Reducing a frame size in a memory for a receiver includes compressing a first analog television picture frame, storing the compressed frame in the memory, decompressing the compressed frame from the memory, obtaining a second analog television picture frame. The first frame includes a first set of pixels that further include at least one of Red/Green/Blue (RGB) samples and, the second frame includes a second set of pixels. Each of the first set of pixels of first frame being decompressed are compared with the corresponding second set of pixels of second frame to obtain an alpha ($\alpha$) factor. A Signal to Noise Ratio (SNR) and a motion per pixel of the first set of pixels and the second set of pixels are compared. Each of a pixel is displayed based on the $\alpha$ factor.

20 Claims, 7 Drawing Sheets

BUFFER SIZE REDUCTION FOR WIRELESS ANALOG TV RECEIVERS

BACKGROUND

1. Technical Field

The embodiments herein generally relate to compression and decompression techniques, and, more particularly, to a technique for reducing buffer size for wireless analog television (TV) receivers.

2. Description of the Related Art

In recent years, techniques of transmitting or storing digital image information in a highly compressed forms or in any other forms have been popular in various apparatuses used in information distribution such as broadcasting and also in home use apparatuses (such as receivers). Image compression and image decompression examples of such forms. Image compression refers to reducing a data quantity of a digital image to such a level that it is capable of being supported by a storage medium. In a typical technique, image information is compressed using redundancy of the image information by means of an orthogonal transform such as a discrete cosine transform and quantizing.

Typically, in analog TV broadcasting, the image information is transmitted in the form of frames which are sent at a rate of 25 or 30 frames per second. Each frame is formed of a number of pixels and color information of the image frame at a particular coordinate. Red, green, and blue are the primary color components of the color image which enables receiving a desired output image. However, the received compressed information suffers wireless channel effects containing frame errors at the receiver side which is shown in FIG. 1.

Figure 1:
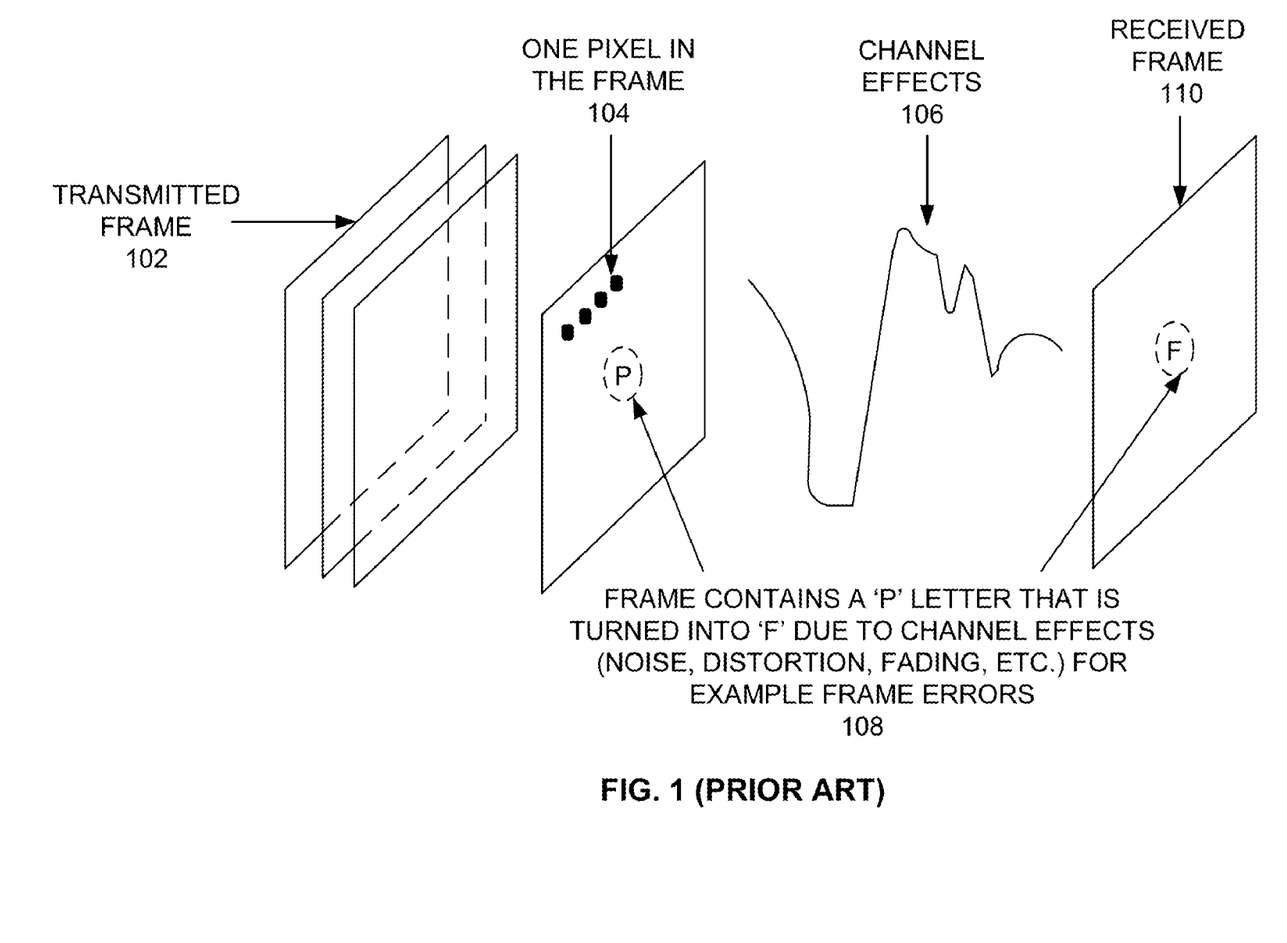
FIG. 1 illustrates wireless illustrates channel effects on conventional transmitted TV frames.

FIG. 1 illustrates wireless channel effects on conventional transmitted TV frames. Each frame is formed of a number of pixels 104 (pixel is the smallest unit of a frame). The transmitted frames 102 suffer from wireless channel effects 106 which produce frame errors (letter 'P' turns to letter 'F' example for frame errors 108). Channel effects 106 are the phenomena that affect the transmitted information along its path to the receiver such as noise, distortion, and fading, etc. Thus, a backend process is required to correct these frames errors 108.

Figure 2:
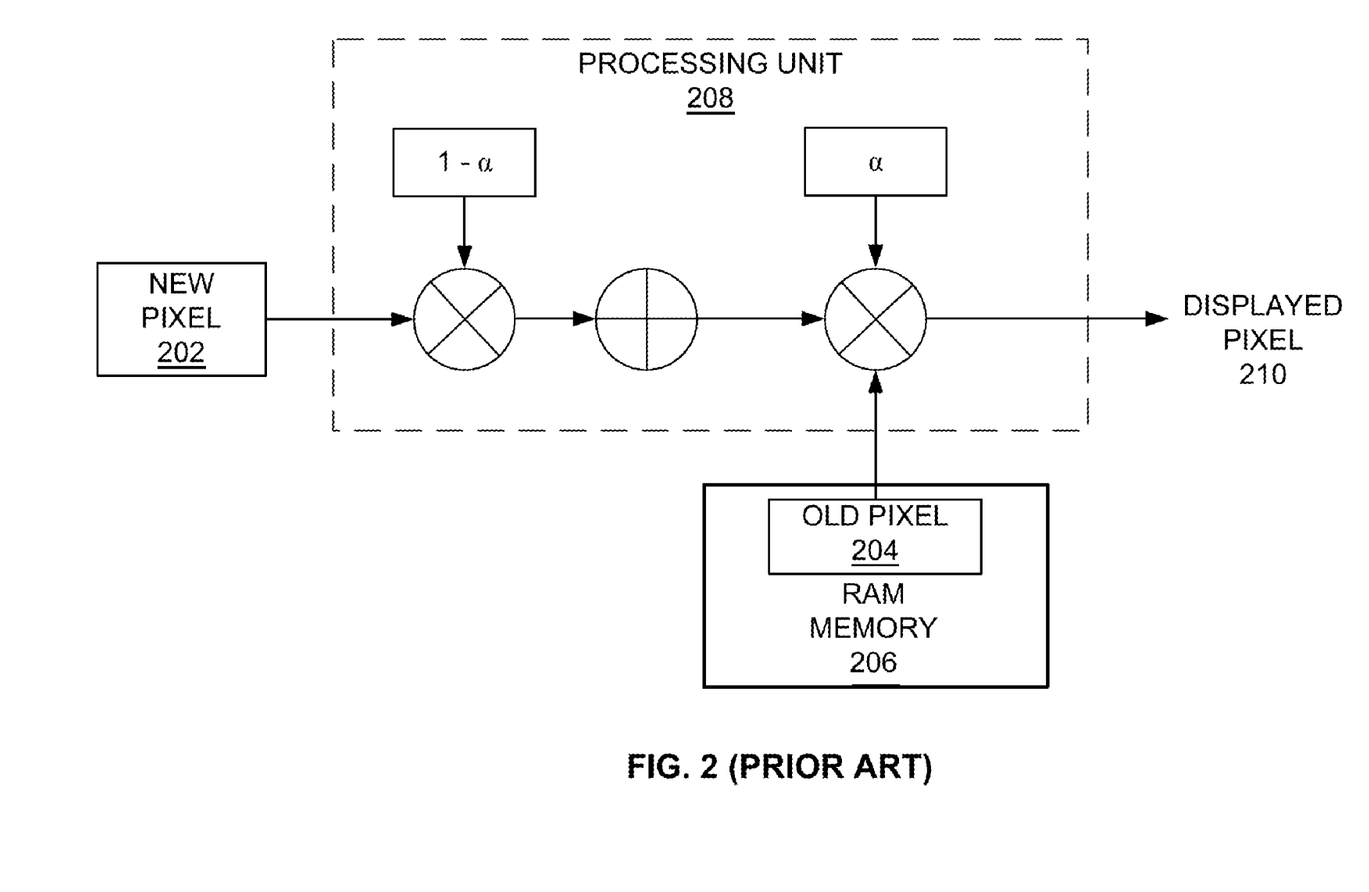
FIG. 2 illustrates a block diagram of a conventional back-end process to correct the frames errors caused by various channel effects.

FIG. 2 illustrates a block diagram of a conventional backend process to correct the frames errors caused by various channel effects. The backend process is performed at the receiver to correct the frame errors due to various channel effects 106. The receiver corrects frame errors by comparing each pixel in the new frame 202 with the corresponding pixel in the previous frames 204. It compares the Signal to Noise Ratio (SNR) and motion per pixel to obtain a factor alpha $\alpha$.

This factor indicates how much the new frame 202 depends on the previous frames 204. The previous frames 204 are stored in the memory 206. The processing unit 208 processes at the receiver comparing the new pixel with a previously stored pixel and is performed on the whole frame based on the calculation as:

Displayed pixel=stored pixel(previously stored frame)
*$\alpha$+new pixel*$(1-\alpha)$.

Typically, the frame size is 320*240 pixels and each pixel is represented by 12 bits. The memory for storing one frame is 320*240*12=900 Kilobits which is a substantially large part of the receiver memory. Since the wireless receiver chip is an application-specific integrated circuit (ASIC), it has a limitations in memory size. Hence, it is not practically possible to increase the memory size. Accordingly, there remains a need to store the whole frame for the receiver without consuming the receiver's memory.

SUMMARY

In view of the foregoing, an embodiment herein provides a method for reducing a frame size in a memory for a receiver. The method includes compressing a first analog television picture frame, storing the compressed frame in the memory, and decompressing the compressed frame from the memory, and obtaining a second analog television picture frame. The first frame includes a first set of pixels, the first set of pixels includes at least one of Red/Green/Blue (RGB) samples and, the second frame includes a second set of pixels. Each of the first set of pixels of first frame being decompressed are compared with the corresponding the second set of pixels of second frame to obtain an alpha ($\alpha$) factor. A Signal to Noise Ratio (SNR) and a motion per pixel of the first set of pixels and the second set of pixels are compared. The $\alpha$ factor indicates a dependency of the second frame over the first frame. Each of a pixel is displayed based on the $\alpha$ factor. The pixel being displayed includes a stored pixel value times $\alpha$, plus a pixel value of the second set of pixels times $(1-\alpha)$.

The compressing process further includes dividing the first frame into the first set of pixels. Each of the first set of pixels of the first frame includes at least one of a RGB sample. The RGB samples of the first set of pixels are subsampled to store less information of Luma and Chroma components. The method includes performing another compression technique that includes performing a Discrete Cosine Transformation (DCT) on each of the first set of pixels of the Luma and Chroma components. An output of the DCT includes a harmonic frequency value. The output of the DCT is quantized by selecting a highest value and a zero out lesser value based on a desired compression ratio, and a Huffman Coding is performed on a resultant 1-D array of the output that is quantized. A resultant bit stream is obtained based on the resultant 1-D array that is Huffman coded. The resultant bit stream is a JPEG encoded frame.

The Luma component includes brightness information and the two color difference components include Chroma component color information. Subsampling is performed by storing more of the Luma component than the Chroma component. The subsampling RGB samples of the first set of pixels are decompressed by interpolation in a 2-Dimensional array. The harmonic frequency values are in a form of 64 harmonic frequency values. A first value of the 64 harmonic frequency values includes a Direct Current (DC) value that indicates a brightness of the first set of pixels. The decompressing of the compressed frame from the memory is performed in a reverse order of the compression technique.

In another aspect, an apparatus to process a frame size reduction for an analog TV receiver without consuming memory of the TV receiver is provided. The apparatus includes a compression unit that compresses a first analog TV picture frame. The first frame includes a first set of pixels. The first set of pixels includes at least one of Red/Green/Blue (RGB) samples. The compressed RGB samples are subsampled to obtain a Luma component and a Chroma component. A memory unit that stores the compressed first frame.

A decompression unit that decompresses the compressed first frame. The compressed subsampled RGB samples of the first set of pixels are decompressed by interpolating in a 2-Dimensional array. The interpolating predicts an unknown pixel from the set of the compressed subsampled pixels. The system further includes a processing unit that processes a comparison of a second set of pixels of a second analog TV picture frame being obtained with a corresponding set of pixels of the decompressed frame. A Signal to Noise Ratio (SNR) and a motion per pixel are compared to obtain an alpha (α) factor that indicates a dependency of the second frame over the first frame. A display unit that displays the pixel. The displayed pixel includes a stored pixel value times α, plus a pixel value of the second set of pixels times (1−α).

The Luma component includes brightness information and the Chroma component includes a two color difference component. The two color difference component includes Chroma component color information. The compression is performed using standard JPEG. The compression unit that compresses the first frame is controlled by performing a Discrete Cosine Transformation (DCT) on the first set of pixels at different frequencies, and quantizing an output based on the DCT. A Huffman Coding is performed on the output that is quantized to form the compressed first frame. The decompression is performed using standard JPEG. The decompression unit is decompresses the compressed frame from the memory and is performed in a reverse order of the compression technique.

In yet another aspect, a system for compressing a first frame in a memory for a wireless analog TV receiver is provided. The system includes means for compressing the first frame that includes a first set of pixels, means for allocating memory for the compressed frame. The compressed frame is a JPEG encoded frame. A means for decompressing the stored compressed frame, means for inputting a second frame that includes a second set of pixels, means for processing the first set of pixels of the first frame and the second set of pixels of the second frame, and means for displaying pixels on the processing being performed. The first set of pixels includes at least one of Red/Green/Blue (RGB) samples, and the RGB samples are subsampled to store less information of Luma and component and Chroma components. The Chroma component includes a two color difference component.

The first frame is compressed using a JPEG image compression technique and stored in the memory. The compression process is controlled by performing a Discrete Cosine Transformation (DCT) on the first set of pixels at different frequencies and quantizing an output based on the DCT. The decompressing process is performed by interpolating the RGB samples being subsampled in a 2-Dimensional array.

The procession of the first frame and the second frame is performed by comparing a Signal to Noise Ratio (SNR) and motion of the first set of pixels of the first frame with a corresponding second set of pixels of the second frame. An alpha (α) factor is determined based on the SNR and motion comparison that indicates the dependency of the second frame over the first frame.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to store the entire frame for the receiver without consuming the receiver's memory. The embodiments herein achieve this by providing a technique for reducing buffer size for wireless analog TV receivers. Referring now to the drawings, and more particularly to FIGS. 3A through 6, where similar reference characters denote corresponding features consistently throughout the figures, there are shown preferred embodiments.

Figure 3:
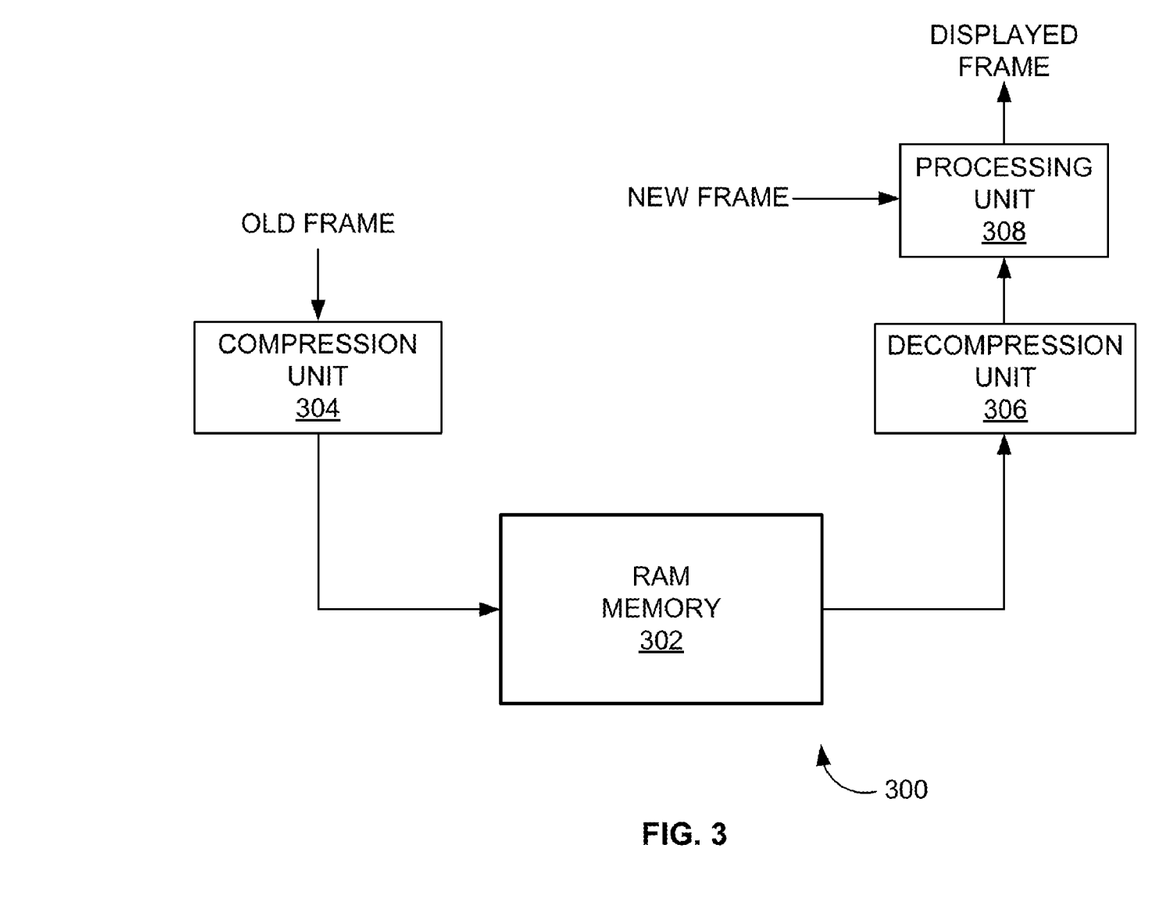
FIG. 3 illustrates a block diagram for frame size reduction according to an embodiment herein.

FIG. 3 illustrates a block diagram for frame size reduction in a memory 302 of a receiver 300 according to an embodiment herein. The block diagram includes the memory 302, a compression unit 304, a decompression unit 306, and a processing unit 308. An old frame (referred to as a first frame) is taken as an input for compression. The compression unit 304 compresses the old frame (the first frame) 204 before storing in the memory 302.

Figure 4:
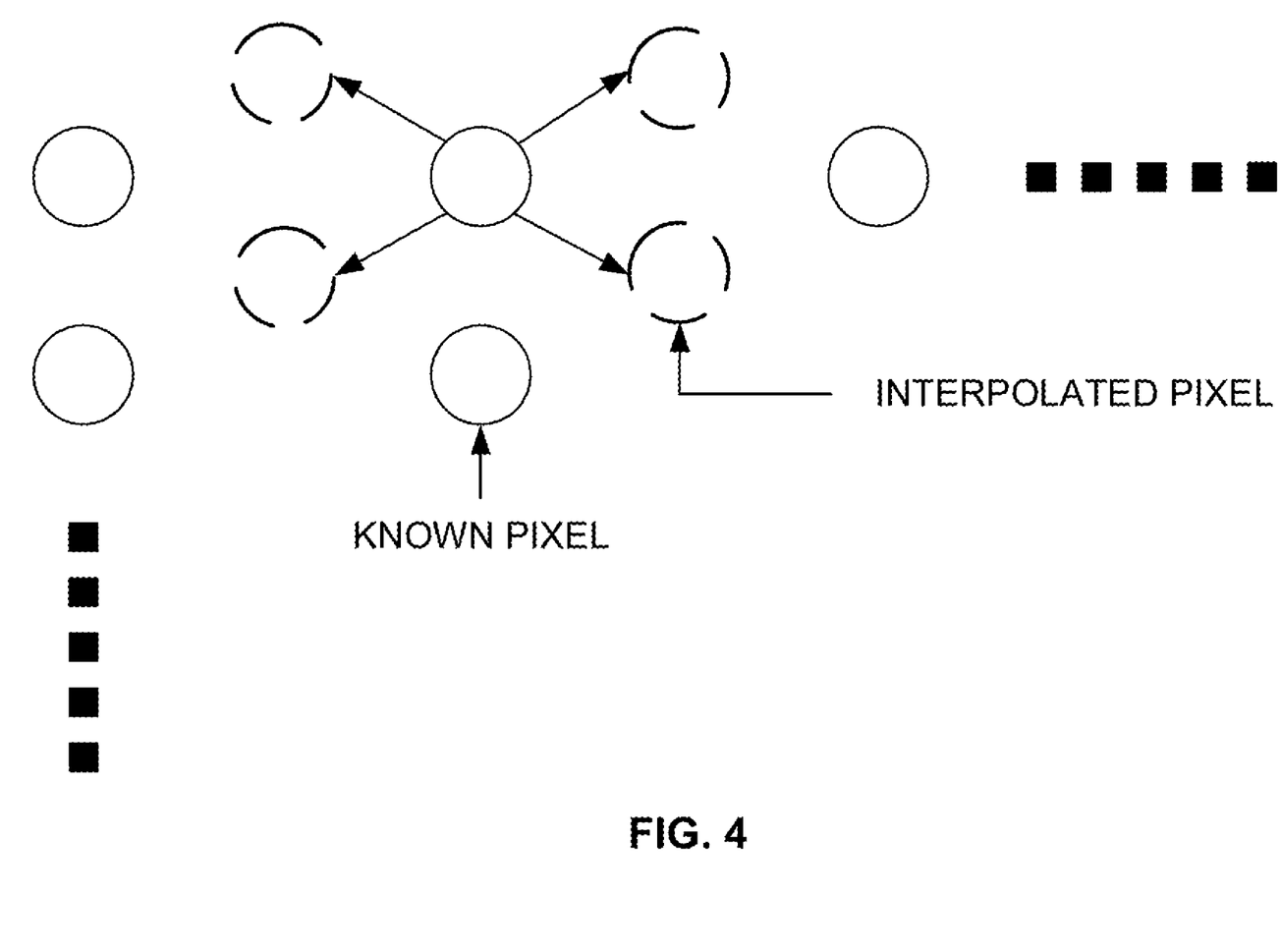
FIG. 4 illustrates decompression of frame pixels by 2-D interpolation according to an embodiment herein.

The compression unit 304 compresses the old frame based on a luminance and bandwidth. The old frame may be optimized by storing more luminance detail than color detail. This is achieved through the use of color difference components. In one embodiment, the pixels are divided into a Luma component (brightness information) and a two color difference component (Chroma component color information). The decompression unit 306 decompresses the old frame (the first frame) that is compressed. The decompress unit 306 performs an interpolation on the subsampled pixels of the compressed frame to predict the unknown pixels from the set of compressed subsampled pixels which is shown in FIG. 4.

The processing unit 308 processes a new frame (referred to as a second frame) and the decompressed frame (the first compressed frame that is decompressed) to be displayed at the receiver's side. In one embodiment, the pixels of the new frame (the second frame) and the decompressed frame (the first frame that is decompressed) are compared to obtain α factor. This factor indicates the dependency of new frame over the decompressed frame. In other words, α factor indicates the dependency of the second frame over the first frame. With reference to FIG. 3, FIG. 4 illustrates a decompression of frame pixels by 2-D interpolation according to an embodiment herein. An interpolation is performed in a 2-D array on the subsampled pixels of the compressed frame to predict the unknown pixels from the set of compressed subsampled pixels.

Figure 5:
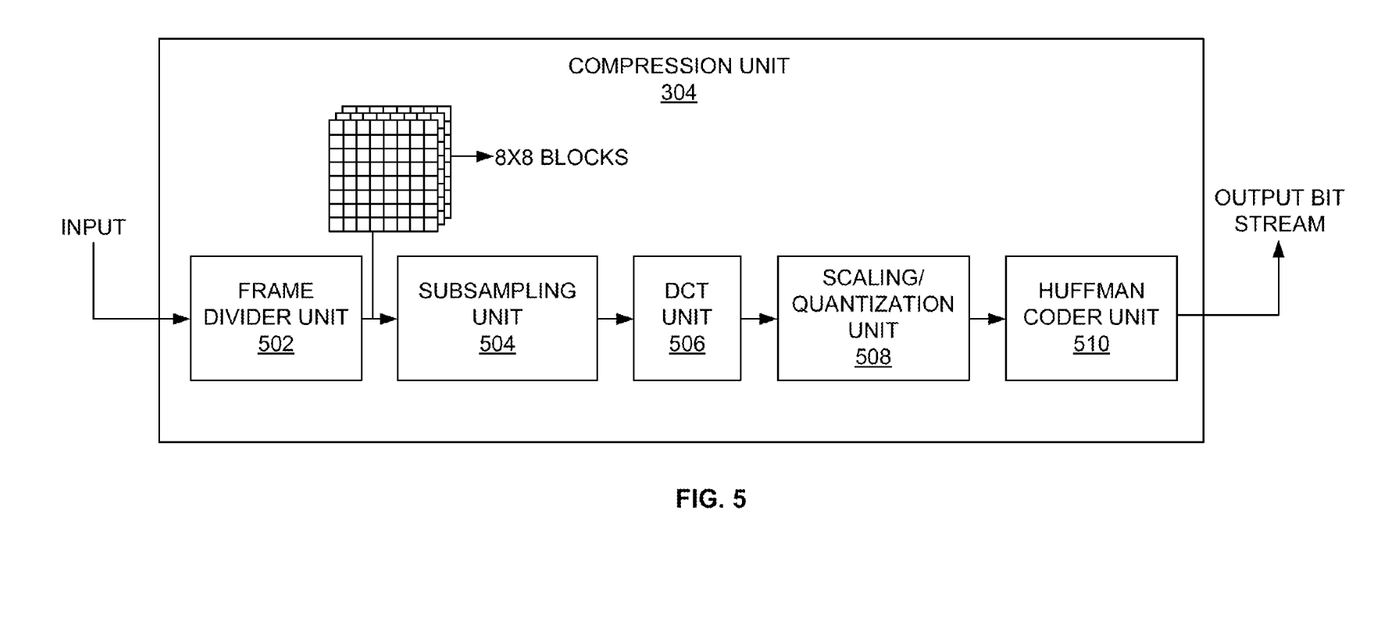
FIG. 5 illustrates a block diagram of the compression unit of FIG. 3 according to an embodiment herein.

FIG. 5 is a block diagram of another embodiment herein, with the compression unit 304 of FIG. 3 illustrating a compression technique having a frame divider unit 502, a subsampling unit 504, a Discrete Cosine Transformation unit 506, a scaling/quantization unit 508, and a Huffman Coder unit 510. The frame divider unit 502 divides the input frame (e.g., the first frame) into a matrix of 8×8 pixels. Each pixel includes at least one of Red/Green/Blue (RGB) samples. The subsampling unit 504 converts the RGB samples to a Luma component and a Chroma component. The Chroma component is a two color difference component. The Luma component includes brightness information and the two color difference component includes Chroma component color information.

The Discrete Cosine Transformation (DCT) unit 506 performs a Discrete Cosine Transformation (DCT) on each pixel of the 8×8 pixels of the Luma and Chroma components. The DCT unit 506 transforms the input (the pixels) to a sum of cosine functions at different frequencies. The different frequencies may be optimized by storing a larger Luma component than the Chroma component. The output of the DCT unit 506 includes a 64 harmonic frequency value. In one embodiment, a first value of the 64 harmonic frequency values is a Direct Current (DC) value that indicates a brightness of a particular block.

The scaling/quantization unit 508 performs a quantization on the output of the DCT by selecting a highest values and a zero out lesser values. In one embodiment, the values are selected based on desired compression ratios. The Huffman coder unit 510 performs a variable length coding on a resultant 1-D array of the output being quantized to obtain a resultant bit stream which is a JPEG encoder output. Similarly, for decompressing the compressed frame, the above steps carried out by the compression unit 304 are performed in a reverse order by interpolating the subsampled pixels in a 2-Dimensional array. The interpolation of subsampled pixels predicts the unknown pixels from the set of compressed subsampled pixels (as shown in FIG. 4).

In one embodiment; the compressed frame is decompressed in a 2-Dimensional interpolation, which depicts the unknown pixels from the set of compressed subsampled pixels. The pixels of the decompressed frame and pixels of a new frame are processed and compared in the processing unit 308, where a SNR and motion per pixel of the decompressed frame and the new frame are compared to obtain α factor. This factor determines the dependency of the new frame over the decompressed frame. Thus, the receiver 300 processes the frame to be displayed without having to consume memory 302 of the receiver 300.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can comprise hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
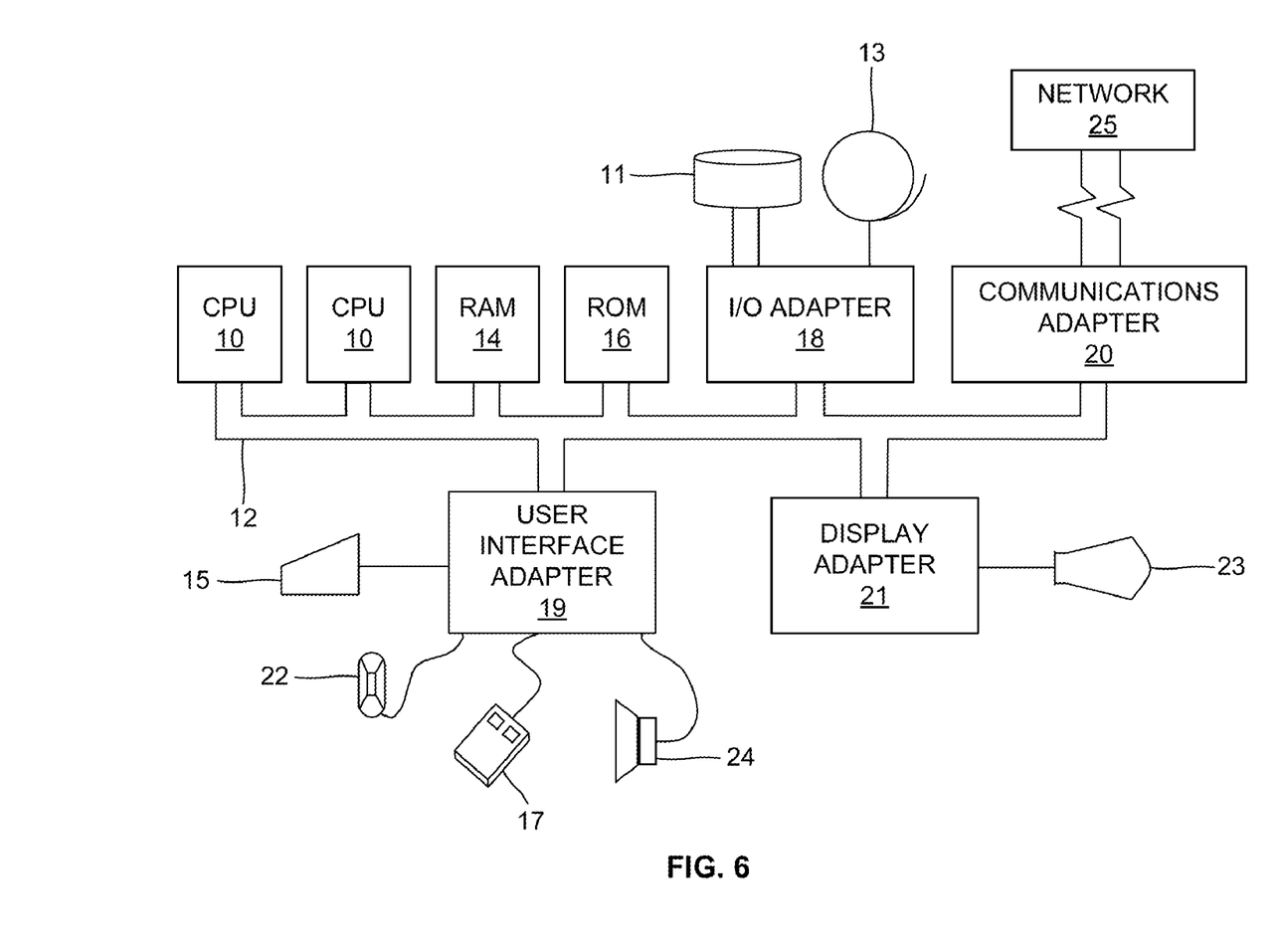
FIG. 6 illustrates a schematic diagram of a computer architecture used in accordance with the embodiments herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. The method for reducing a frame size in a memory for a receiver is performed by compressing the input frame and storing it in a memory.

Figure 7:
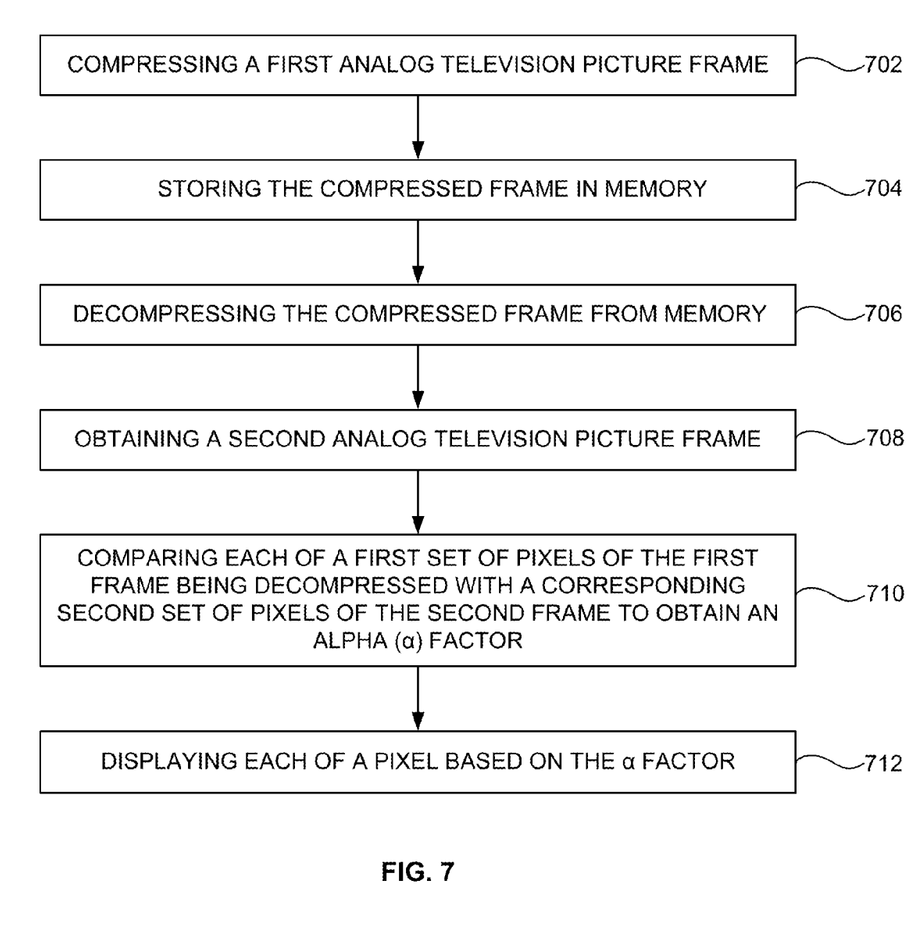
FIG. 7 is a flow diagram illustrating a method for reducing a frame size in a memory for a receiver according to an embodiment herein.

FIG. 7 with reference to FIG. 3A through FIG. 6, is a flow diagram illustrating a method for reducing a frame size in a memory for a receiver according to an embodiment herein. In step 702, a first analog television picture frame is compressed. The first frame includes a first set of pixels that includes at least one of Red/Green/Blue (RGB) samples. In step 704, the compressed frame is stored in the memory. In step 706, the compressed frame that is stored in the memory is decompressed. In step 708, a second analog television picture frame is obtained. The second frame includes a second set of pixels.

In step 710, each of the first set of pixels of the first frame that are decompressed are compared with the corresponding second set of pixels of the second frame to obtain an alpha ($\alpha$) factor. A Signal to Noise Ratio (SNR) and a motion per pixel of the first set of pixels and the second set of pixels are compared. This factor indicates a dependency of the second frame over the first frame. In step 712, Each of a pixel is displayed based on the $\alpha$ factor. The displayed pixel includes a stored pixel value times $\alpha$, plus a pixel value of the second set of pixels times $(1-\alpha)$.

The compressing process may include dividing the first frame into the first set of pixels, and subsampling the RGB samples of the first set of pixels to store less information of Luma and Chroma components. The Chroma component is a two color difference component. The compressing process may further include performing a Discrete Cosine Transformation (DCT) on each of the first set of pixels of the Luma and Chroma components. An output of the DCT is a harmonic frequency value. The output of the DCT is quantized by selecting a highest value and a zero out lesser value based on a desired compression ratio, and a Huffman Coding is performed on a resultant 1-D array of the output that is quantized. A resultant bit stream obtained is based on the resultant 1-D array that is Huffman coded. The resultant bit stream is a JPEG encoded frame.

The DCT is performed at different frequencies. The Luma component includes brightness information and the two color difference components include Chroma component color information. The subsampling is performed by storing more of the Luma component than the Chroma component. The compressed subsampled RGB samples of the first set of pixels are decompressed by interpolation in a 2-Dimensional array. The decompression of compressed frame is performed in a reverse order of the compression technique.

The compressed frame is decompressed in a 2-Dimensional interpolation which depicts the unknown pixels from the set of compressed subsampled pixels. The pixels of the decompressed frame and pixels of a new frame are processed and compared in the processing unit, where a SNR and motion per pixel of the decompressed frame and the new frame are compared to obtain $\alpha$ factor. This factor determines the dependency of the new frame over the decompressed frame. Thus the receiver processes the frame to be displayed without having to consume memory of the receiver.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for reducing a frame size in a memory for a receiver, said method comprising:

compressing a first analog television picture frame, wherein the first frame comprises a first set of pixels, said first set of pixels comprising at least one of Red/Green/Blue (RGB) samples, wherein said compressed RGB samples are subsampled to obtain a luma and a chroma component;

storing the compressed frame in said memory;

decompressing said compressed frame from said memory, wherein said decompressing comprises interpolation in a 2-Dimensional array, wherein said interpolation in said 2-Dimensional array predicts an unknown pixel from a set of compressed subsampled pixels;

obtaining a second analog television picture frame, wherein the second frame comprises a second set of pixels;

comparing each of said first set of pixels of first frame being decompressed with the corresponding said second set of pixels of second frame to obtain an alpha ($\alpha$) factor, wherein a Signal to Noise Ratio (SNR) and a motion per pixel of said first set of pixels and said second set of pixels are compared, wherein said $\alpha$ factor indicates a dependency of said second frame over said first frame; and displaying each of a pixel based on said $\alpha$ factor, wherein said pixel being displayed comprises a stored pixel value times $\alpha$, plus a pixel value of said second set of pixels times $(1-\alpha)$.

2. The method of claim 1, wherein the compressing process further comprises:

dividing said first frame into said first set of pixels, wherein each of said first set of pixels of said first frame comprises at least one of a RGB sample;

subsampling said RGB samples of said first set of pixels to store less information of Luma and Chroma components.

3. The method of claim 2, wherein said subsampling is performed by storing more of said Luma component than said Chroma component.

4. The method of claim 1, further comprising performing another compression technique comprising:
- performing a Discrete Cosine Transformation (DCT) on each of said first set of pixels of the Luma and Chroma components, wherein an output of said DCT comprises a harmonic frequency value;
- quantizing said output of said DCT by selecting a highest value and a zero out lesser value based on a desired compression ratio; and
- performing a Huffman Coding on a resultant 1-D array of said output being quantized, wherein a resultant bit stream is obtained based on said resultant 1-D array being Huffman coded, wherein said resultant bit stream comprises a JPEG encoded frame.

5. The method of claim 4, wherein said harmonic frequency values is in a form of 64 harmonic frequency values, wherein a first value of said 64 harmonic frequency values comprises a Direct Current (DC) value, and wherein said DC value indicates a brightness of said first set of pixels.

6. The method of claim 4, wherein said decompressing said compressed frame from said memory is performed in a reverse order of said compression technique.

7. The method of claim 1, wherein said Luma component comprises brightness information and said Chroma component comprises a two color difference component, wherein said two color difference component comprises Chroma component color information.

8. An apparatus to process a frame size reduction for an analog TV receiver without consuming memory of the TV receiver, said apparatus comprising:
- means for compressing a first analog TV picture frame, wherein the first frame comprises a first set of pixels, wherein said first set of pixels comprises at least one of Red/Green/Blue (RGB) samples, and wherein the compressed RGB samples are subsampled to obtain a Luma component and a Chroma component;
- means for storing the compressed first frame;
- means for decompressing said compressed first frame, wherein the compressed subsampled RGB samples of said first set of pixels are decompressed by interpolating in a 2-Dimensional array, and wherein said interpolating predicts an unknown pixel from the set of said compressed subsampled pixels;
- means for processing a comparison of a second set of pixels of a second analog TV picture frame being obtained with a corresponding set of pixels of said decompressed frame, wherein a Signal to Noise Ratio (SNR) and a motion per pixel are compared to obtain an alpha ($\alpha$) factor that indicates a dependency of said second frame over said first frame; and
- means for displaying said pixel, wherein the displayed pixel comprises a stored pixel value times $\alpha$, plus a pixel value of said second set of pixels times $(1-\alpha)$.

9. The apparatus of claim 8, wherein said Luma component comprises brightness information and said Chroma component comprises a two color difference component, and wherein said two color difference component comprises Chroma component color information.

10. The apparatus of claim 8, wherein said compression is performed using standard JPEG, wherein said means for compressing is controlled by performing a Discrete Cosine Transformation (DCT) on said first set of pixels at different frequencies, and quantizing an output based on said DCT, and wherein a Huffman Coding is performed on said output being quantized to form said compressed first frame.

11. The apparatus of claim 8, wherein said decompression is performed using standard JPEG, and wherein said means for decompressing decompresses said compressed frame from said memory and is performed in a reverse order of said compression technique.

12. The apparatus of claim 8, wherein said analog TV receiver comprises a wireless analog TV receiver.

13. A system for compressing a first frame in a memory for a wireless analog TV receiver, said system comprising:
- means for compressing said first frame, said first frame comprising a first set of pixels;
- means for allocating memory for the compressed frame, wherein said compressed frame comprises a JPEG encoded frame;
- means for decompressing the stored compressed frame;
- means for inputting a second frame, said second frame comprising a second set of pixels;
- means for processing said first set of pixels of said first frame and said second set of pixels of said second frame; and
- means for displaying pixels on the processing being performed,
- wherein said first set of pixels comprises Red/Green/Blue (RGB) samples, said RGB samples being subsampled to store less information of Luma and Chroma components, wherein said Chroma component comprises a two color difference component,
- wherein said first frame is compressed using a JPEG image compression technique and stored in said memory, and wherein said compression process is controlled by performing a Discrete Cosine Transformation (DCT) on said first set of pixels at different frequencies and quantizing an output based on said DCT,
- wherein said decompressing process is performed by interpolating said RGB samples being subsampled in a 2-Dimensional array,
- wherein said interpolation in said 2-Dimensional array predicts an unknown pixel from a set of compressed subsampled pixels, and
- wherein said processing said first frame and said second frame is performed by comparing a Signal to Noise Ratio (SNR) and motion of said first set of pixels of said first frame with a corresponding said second set of pixels of said second frame.

14. The system of claim 13, wherein an alpha ($\alpha$) factor is determined based on said SNR and motion being compared.

15. The system of claim 14, wherein said $\alpha$ factor indicates dependency of said second frame over said first frame.

16. The system of claim 13, further comprising performing a Huffman Coding on a resultant 1-D array of said output being quantized, wherein a resultant bit stream is obtained based on said resultant 1-D array being Huffman coded, wherein said resultant bit stream comprises a JPEG encoded frame.

17. The system of claim 13, wherein the Luma component comprises brightness information.

18. The system of claim 13, wherein the subsampling is performed by storing more of said Luma component than said Chroma component.

19. The system of claim 13, wherein an output of said DCT comprises a harmonic frequency value, and wherein said harmonic frequency values is in a form of 64 harmonic frequency values, wherein a first value of said 64 harmonic frequency values comprises a Direct Current (DC) value, and wherein said DC value indicates a brightness of said first set of pixels.

20. The system of claim 13, wherein decompressing the compressed frame is performed in a reverse order of the compression technique.

* * * * *